United States Patent [19]
Nickerson

[11] Patent Number: 5,735,728
[45] Date of Patent: Apr. 7, 1998

[54] DEVICE FOR LIFTING AND MOVING BEEHIVE BOXES

[76] Inventor: Eric J. Nickerson, 1711 Chateau Ct., Fallston, Md. 21047

[21] Appl. No.: 770,376
[22] Filed: Nov. 29, 1996
[51] Int. Cl.⁶ ..................................................... A01K 55/00
[52] U.S. Cl. ........................................................ 449/1; 449/64
[58] Field of Search ................................... 449/51, 61, 64, 449/1

[56] References Cited

U.S. PATENT DOCUMENTS

| | | |
|---|---|---|
| 775,691 | 11/1904 | de Valdivielso ........................... 449/51 |
| 964,534 | 7/1910 | McGiffert. |
| 988,124 | 3/1911 | McGiffert. |
| 2,275,704 | 3/1942 | Turner, Sr. .................................. 294/67 |
| 2,630,334 | 3/1953 | Ewers ........................................ 280/289 |
| 4,392,679 | 7/1983 | Barnes et al. ............................. 294/15 |
| 4,573,228 | 3/1986 | Bachalo ..................................... 449/51 |
| 4,722,106 | 2/1988 | Scegiel et al. ............................. 449/61 |

FOREIGN PATENT DOCUMENTS 1246964  7/1986  U.S.S.R. ................................ 449/64

Primary Examiner—Robert P. Swiatek
Attorney, Agent, or Firm—Leonard Bloom

[57] ABSTRACT

A device for lifting and moving beehive boxes has two legs hinged at their upper ends to form a triangular structure having a suspension joint at its apex. A chain is hooked to the apex of the triangular structure, and a gripper is suspended to the chain. Lower ends of the two legs are connected by a rope which prevents them from moving apart and facilitates in adjusting the distance between them. To move an upper box of the beehive, the two legs are spread apart and pressed against the ground, the structure is tilted toward the beehive so that the gripper engages the hand recesses on two opposite side walls of the upper box, and then the structure is tilted away from the beehive, such that the box is initially slightly lifted above the lower box of the beehive and then is moved towards the desired position away from the beehive. After inspecting and servicing the lower box(es), the upper box(es) are re-installed back on the beehive employing the same device; and thereafter the chain and the gripper are removed and the legs are brought to their folded position for compact storage.

14 Claims, 5 Drawing Sheets

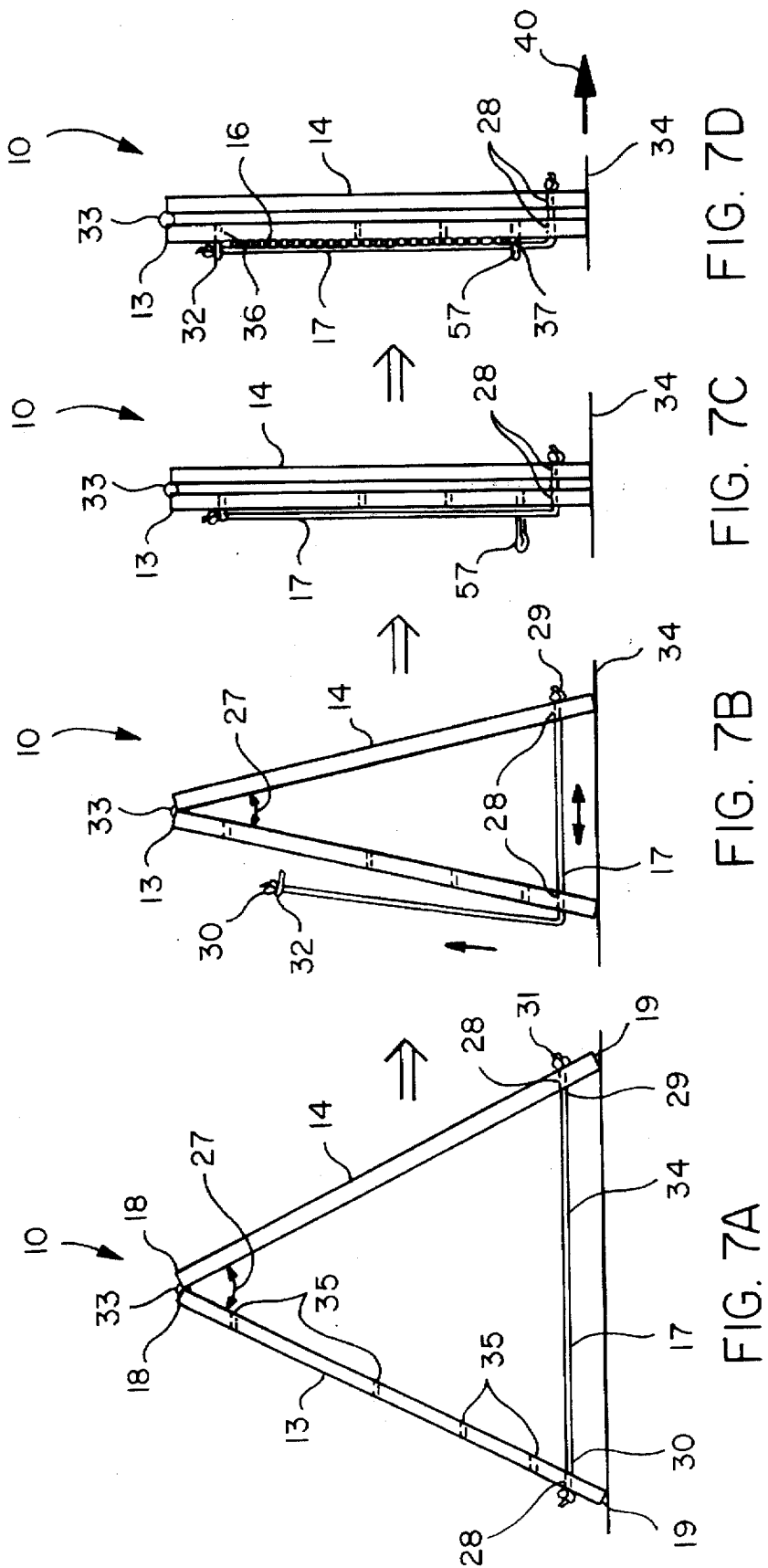

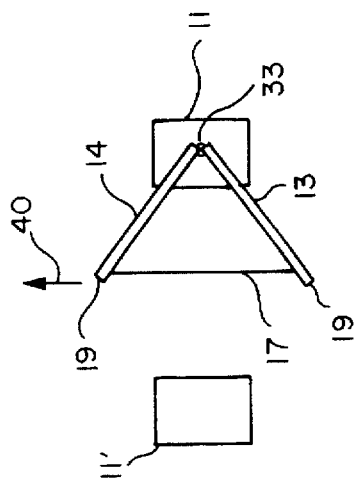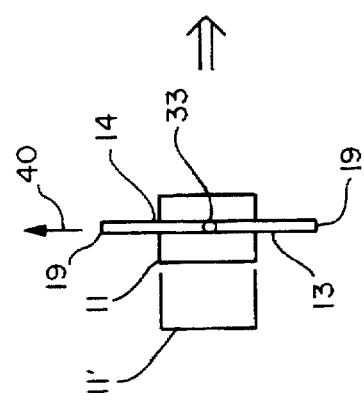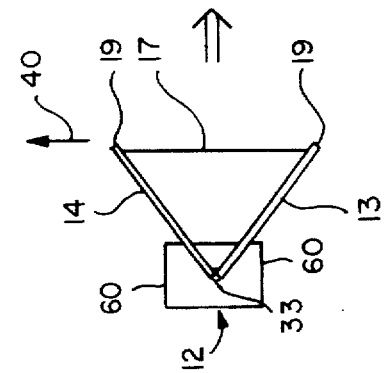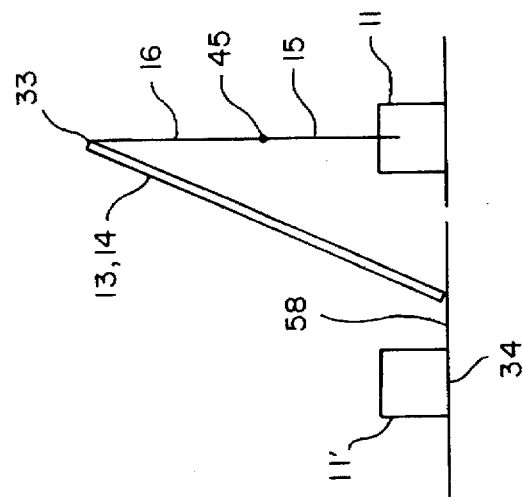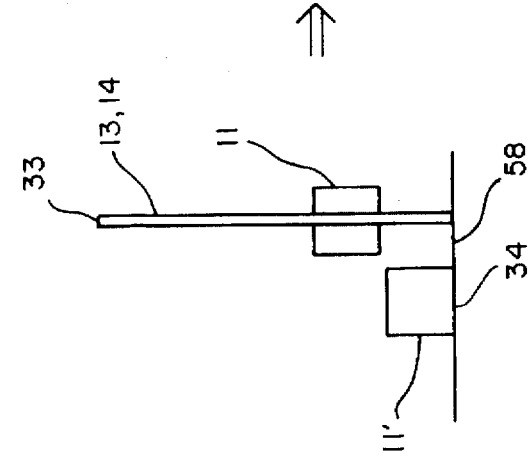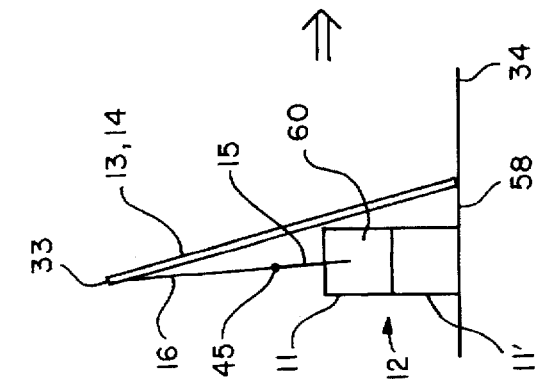

DEVICE FOR LIFTING AND MOVING BEEHIVE BOXES

FIELD OF THE INVENTION

The present invention relates to lifting devices, and more particularly, to lifting and moving devices for beehive boxes.

BACKGROUND OF THE INVENTION

Beehive boxes, throughout the world, come in standard sizes. These boxes are stacked up (usually two boxes, one on the top of the other) and the bees make their combs inside of frames within the boxes. There may be a queen bee and 20,000 bees inside of each box.

These beehive boxes must be inspected, serviced and repaired fairly often, and there are various routines to assure that the bees can thrive within the boxes.

These boxes are fairly heavy and may weigh as much as 80 to 90 pounds. It is often difficult and awkward to lift off the top box to gain access to the bottom box.

Attempts have been made in the art to ease inspection of beehive boxes.

U.S. Pat. No. 2,275,704 discloses a beekeeper's hoist which comprises a tripod frame composed of three legs connected together at their tops and a hook suspended from the top of the tripod frame. One of the legs of the tripod frame is provided with a reel having a crank. By rotating the crank, the height of the suspension of the hook can be adjusted. A hive engaging clamp, consisting of spaced parallel bars, is suspended on the hook by means of ropes or chains. When it is desired to inspect the beehive, the hive engaging clamp is positioned so that the spaced bars thereof engage handles (or other recesses) on the opposite side walls of the beehive; and by rotating the crank of the reel, the boxes in the beehive may be lifted and swung to a side.

This beekeeper's hoist is somewhat bulky and complex. Besides, when it is desired to take boxes off the beehive and to place them on the ground aside from the beehive, a user must lift the boxes up (by means of rotating the crank of the reel) and then pull the lifted box towards a desired place (to a side) and simultaneously gradually releasing the reel, thereby lowering the lifted boxes to the ground. This is obviously not a simple manipulation, and hardly can be performed by one person.

As a matter of fact, this hoist is designed to lift an entire stack of boxes all at once and, therefore, it is massive and heavy. Since it is not provided with a convenient means to move the load laterally, a beekeeper would be tempted to lift several boxes (the load) and to service the box(es) remaining on the ground while the load hangs directly overhead. If the cable breaks at that moment, the consequences could be very serious.

U.S. Pat. No. 4,722,106 discloses a beehive lifting device which is used with a crane and includes a folding frame and a pair of lifting arms which are parallel and spaced each from the other. The lifting arms are attached near the bottom of the folding frame and extend orthogonally outwardly therefrom. When desired, the lifting arms engage the side walls of the beehive (or a certain box in the beehive) and the folding frame is suspended by its load lifting point to a crane, which carries the beehive (or the box) away or loads it on a truck. This lifting device is intended primarily for mechanization of the beekeeping, and requires a beekeeper to purchase a crane which is not always affordable and worthwhile for a beekeeper who keeps just several beehives and needs a very simple and inexpensive device for moving the boxes when the inspection and servicing of the beehive boxes is desired.

Since most hobbyist beekeepers work alone, a beehive lifting device must be easy to operate by one person, must be light for carrying by hand from one hive to another, and must be safe in operation. Besides, beekeeping as a hobby is traditionally a low-cost activity, and thus the lifting device has to be inexpensive.

Disadvantageously, the prior art lifting devices fail to achieve these objectives.

BRIEF SUMMARY OF THE INVENTION

It is, therefore, an object of the present invention to provide a convenient, simple to use, and inexpensive device for lifting and moving beehive boxes.

According to the teachings of the present invention, a device for moving beehive boxes from a first position to a second position comprises a pair of legs capable of being in an expanded position and in a folded position. In their expanded position, the legs are angled to each other at their upper ends in a first plane and, being supported by the ground, are capable of pivoting in a plane substantially perpendicular to the first plane about an axis connecting the lower ends of the legs.

A gripper, comprising two tongs pivoted to each other, is suspended by a suspension means (for instance, a chain) to the upper ends of the pair of the legs.

In use, the lower ends of the legs, in their expanded position, are placed on the ground a certain distance from a beehive, and are tilted towards the beehive until the hook-shaped ends of each tong of the gripper engage respective recesses on the opposite side walls of the box to be moved. Thereafter, the legs are tilted in a plane perpendicular to the first plane and away from the beehive, thereby moving the box to the desired position.

The angle between the tongs (at their first ends) is adjustable.

Preferably, the chain has a pair of hooks, each at a respective end of the chain, such that the chain is secured to the upper ends of the legs by means of one of the pair of hooks, and such that the length of the chain is adjusted by means of engaging another hook to a respective one of a plurality of links constituting the chain.

A rope is secured between the lower ends of the splayed legs. By adjusting the length of the rope, the angle between the legs at their upper ends is adjustable.

Preferably, a plurality of apertures is provided along one of the legs, such that an eye-bolt provided at one end of the rope engages a respective one of the plurality of apertures, thereby adjusting the angle between the legs at their upper ends. In the folded position of the legs, the eye-bolt is secured within the upper aperture, such that the rope holds the lower ends of the legs adjacent to each other.

Viewed in another aspect, the present invention is a method for moving the beehive boxes for facilitating the inspection and servicing of the beehive. According to this method, a triangular structure having two expanded legs and a suspended gripper is positioned a certain distance from the beehive with the lower ends of the legs suitably anchored or positioned on the ground. Thereafter, the triangular structure is tilted towards the beehive, and the gripper engages the opposite side walls of the upper box by hook-shaped ends of the tongs of the gripper. By tilting the structure in the opposite direction from the beehive, the box is slightly lifted above the lower box and is moved to a desired position on the ground; and the lower box can then be inspected and serviced.

Once this work has been done, and the box has been returned back (with help of the triangular structure), the triangular structure can be disassembled and folded. For this purpose, the gripper is disconnected from the chain, the chain is disconnected from the upper ends of the two legs; and by pulling one end of the rope at the lower ends of the legs towards the upper ends of the legs, the structure is returned from its expanded back to its folded position. This end of the rope is further secured to one of the legs close to the upper end thereof, thereby maintaining the legs in their folded position.

These and other objects of the present invention will become apparent from a reading of the following specification taken in conjunction with the enclosed drawings.

BRIEF DESCRIPTION OF THE DRAWINGS

FIGS. 7A-7D show, in sequence, the steps of translating the device of the present invention from the expanded position to the folded position thereof.

FIGS. 8A-8C is a top view showing, schematically, how the device of the present invention moves the box from one position to another.

FIGS. 9A-9C is a side view showing, schematically, how the device of the present invention moves the box from one position to another one. FIG. 9A corresponds to FIG. 8A, FIG. 9B corresponds to FIG. 8B, and FIG. 9C corresponds to FIG. 8C, respectively.

DESCRIPTION

Figure 1A:
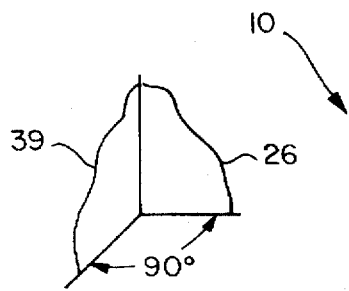
FIG. 1A shows, schematically, two planes perpendicular to each other, one plane corresponding to the plane of the triangular structure, and another plane corresponding to the plane in which the triangular structure is pivoted.

Referring to FIGS. 1–9C, a device 10 for lifting and moving short distances a box 11 of a beehive 12 comprises a pair of legs 13 and 14 made of wood or any suitable material, a gripper 15, a chain 16, and a rope 17.

Figure 1:
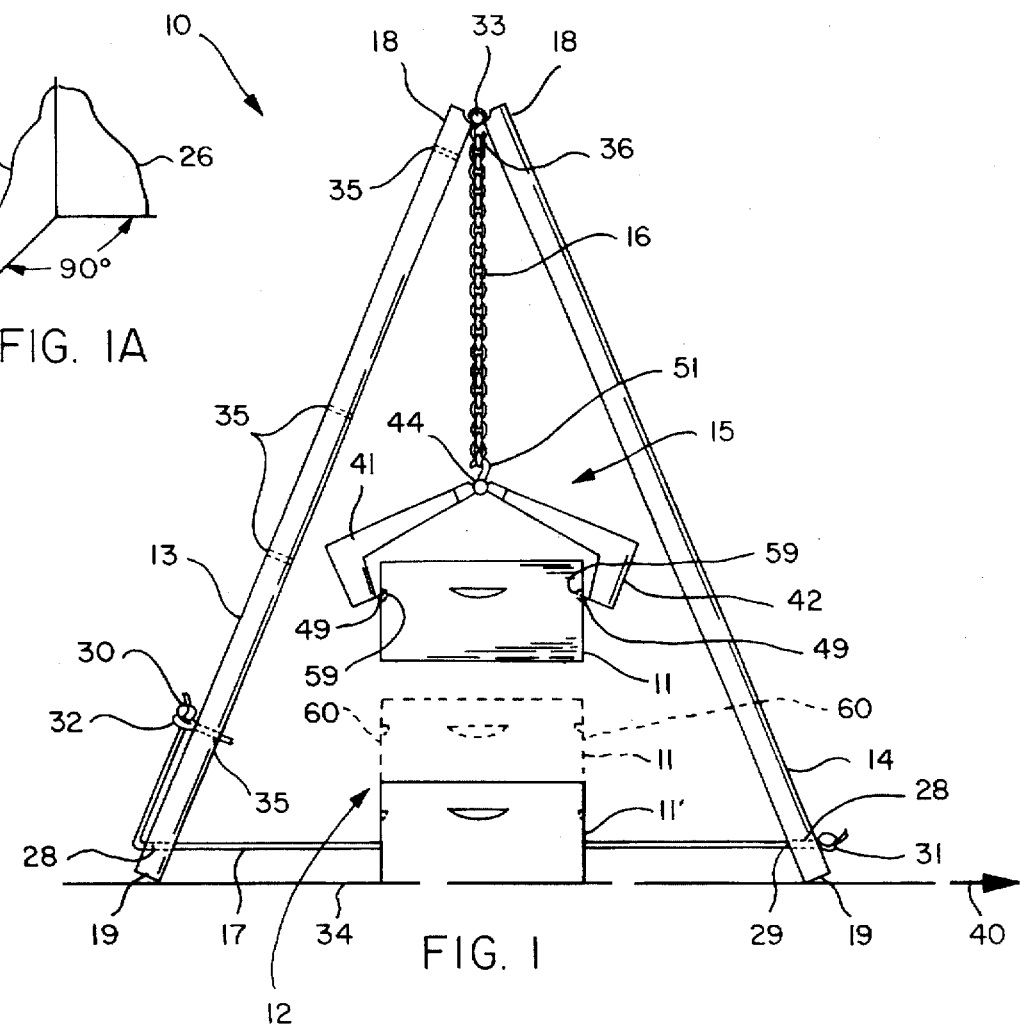
FIG. 1 is a front view of the device of the present invention with the box lifted above its original position.
Figure 2:
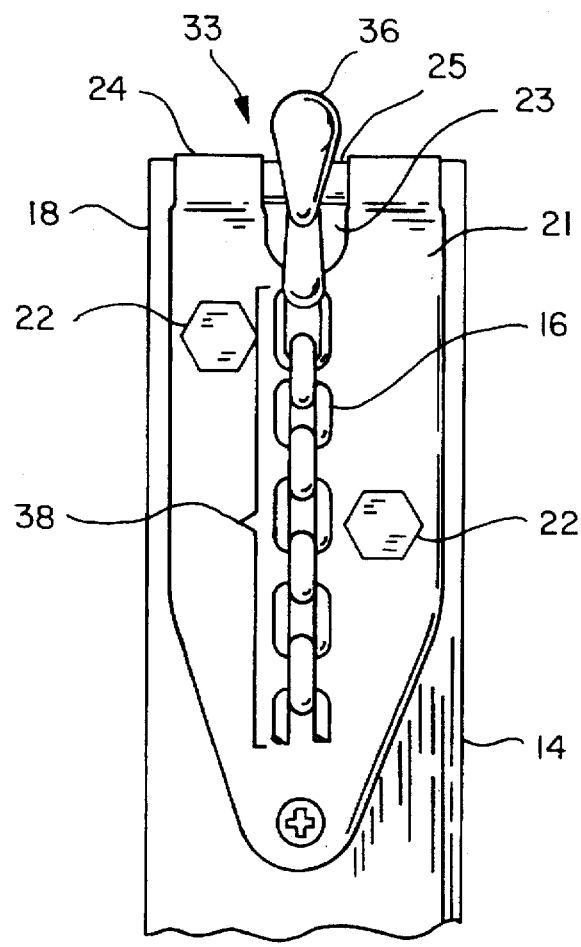
FIG. 2 is a partial view of the inner side of one of the legs showing the upper end thereof, and drawn to an enclosed scale.
Figure 3:
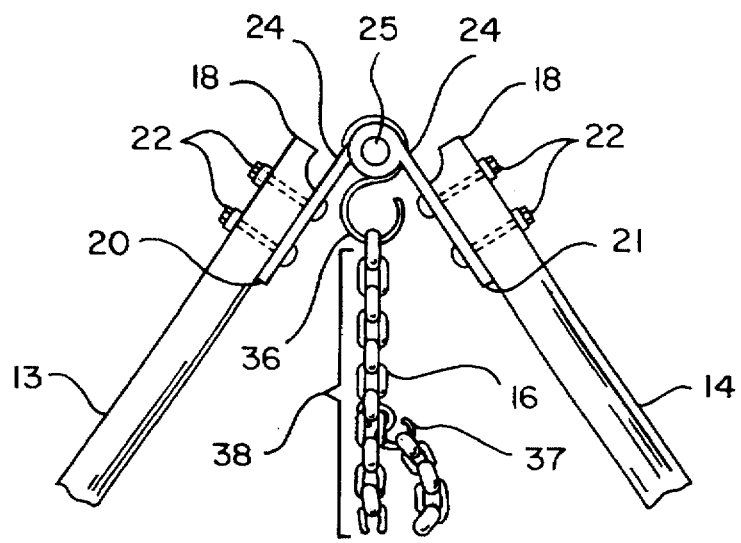
FIG. 3 is a partial view of the device of the present invention, showing the upper ends of the legs constituting the suspension point thereof and the chain secured thereto, and drawn to an enlarged scale.
Figure 4:
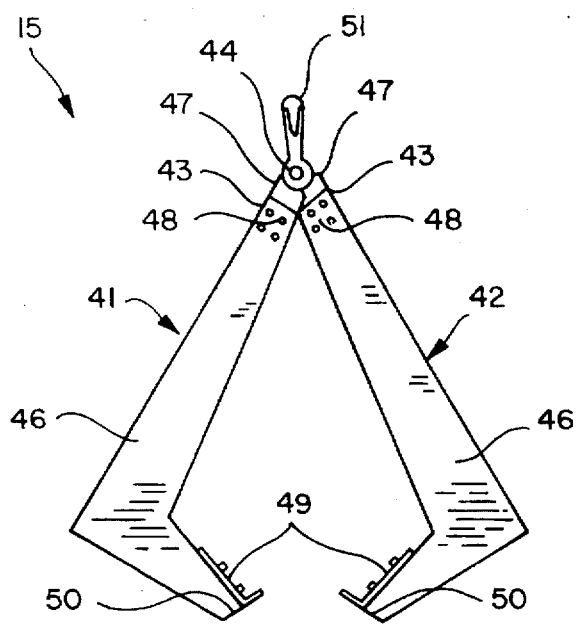
FIG. 4 is a front view of the gripper of the present invention.
Figure 5:
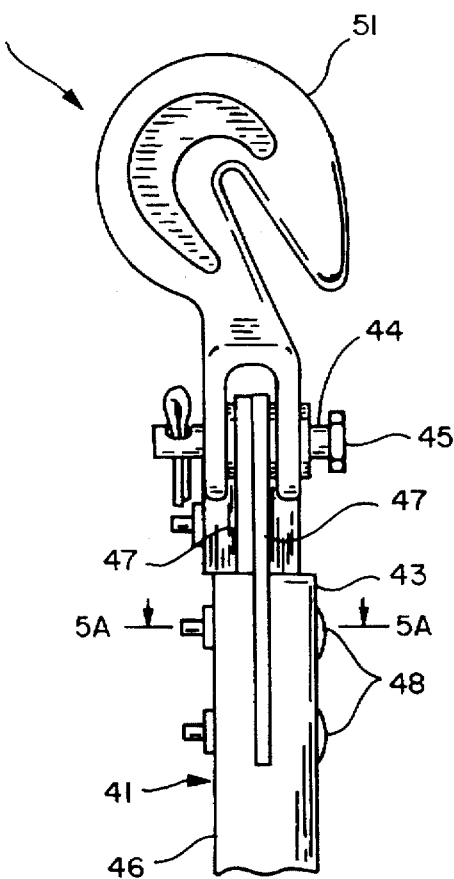
FIG. 5 is a partial side view of the gripper of FIG. 4, showing the lifting point thereof, and drawn to an enlarged scale.

Each leg 13, 14 has an upper end 18 and a lower end 19. Metal plates 20, 21, best shown in FIGS. 2 and 3, are secured at the upper ends 18 of the legs 13 and 14 by fasteners 22. One of the plates 20, 21 (for example, the plate 21 secured to the leg 14) has an opening 23, the purpose of which is discussed herein. On their top edges 24, the plates 20, 21 are hinged together by a pin 25, such that the plates 20, 21 can pivot about the pin 25 with respect to each other. As best shown in FIGS. 1, 3 and 7, the legs 13, are angled at their upper ends 18 to each other in the plane 26 (as shown in FIG. 1A). The angle 27 between the legs 13, 14 can be adjusted (as will be discussed below) and can be equal to zero when the legs 13, 14 are in their folded position.

As best shown in FIG. 1, the rope 17 is secured to the lower ends 19 of the legs 13, 14. For this purpose, through holes 28 are provided at the lower ends 19 of the legs 13, 14. The end 29 of the rope 17 protrudes through the hole 28 and is secured to the lower end 19 of the leg 14 by a knot 31, or any other suitable means. The end 30 of the rope 17 protrudes through the hole 28 at lower end 19 of the leg 13, and is prevented from being pulled away by a eye-bolt 32.

As best shown in FIGS. 1 and 7A-7C, by pulling the end 30 of the rope 17 towards the upper end 18 of the leg 13, the distance between the lower ends 19 of the legs 13, 14 is controlled and the angle 27 is gradually adjusted. By changing the distance between the lower ends 19 of the splayed legs 13, 14, the height of a suspension point 33 (i.e. top ends 19 of hinged legs 13, 14) above the ground 34 (which can be also any base) is adjusted.

The leg 13 is provided with a series of side recesses (or apertures) 35 uniformly spaced along the length of the leg 13, such that the eye-bolt 32 can be inserted into one of them, the position of which corresponds to the required height of the suspension point 33. When the rope 17 is pulled out completely (as shown in FIGS. 7A-7C), such that the legs 13, 14 are in their folded position, then the eye-bolt 32 is inserted into the upper one of all the apertures 35.

After the legs 13 and 14 are expanded at their lower ends 19, the chain 16 is connected to the suspension point 33, as best shown in FIGS. 1, 2 and 3. For this purpose, either a hook (not shown) is provided near the upper end 18 of one of the legs 13, 14 and the chain 16 is carried by this hook; or, as preferred and best shown in FIG. 3, the chain 16 has a hook 36 on one of its ends; and by this hook 36, the chain 16 is suspended below the point 33, such that the hook 36 protrudes through the opening 23 on the plate 21 and hangs on the pin 25. The chain 16 also has another hook 37.

As best shown in FIG. 3, the hook 37 can be protruded through any of the links 38 of the chain 16 such that to adjust the length of the chain 16.

In another modification, in order to further reduce the cost of the device 10, the chain 16 can be simply wound around the pin 25 and retained in position by the hook 37.

As best shown in FIGS. 1, 8A-8C and 9A-9C, when, in their expanded position, the legs 13, 14 press against the base 34 at their lower ends 19, they are capable of pivoting in a plane 39 (shown in FIG. 1A) perpendicular to the plane 26 about an axis 40 parallel to the rope 17 connecting the lower ends 19 of the legs 13, 14.

The gripper 15, best shown in FIGS. 1 and 4–5A, includes two tongs 41 and 42 pivoted to each other at their ends 43 about a pivot pin 44 which constitute a lifting point 45 of the gripper 15. Each tong 41, 42 comprises a wooden arm 46, a metal plate 47 secured to the tong 41, 42 by fasteners 48, and hook-shaped members 49 secured at the lower end 50 of the tong 41, 42. A hook 51 is secured to the pivot lifting pin 44 at the lifting point 45 of the gripper 15 in order to facilitate suspension of the gripper 15 to the chain 16. When needed, the lifting hook 51 protrudes into the lowest link of the length-adjusted chain 16, and thereby the gripper 15 is suspended via the chain 16 to the upper ends 18 of the two legs 13, 14.

The tongs 41, 42 may be made of any other suitable material, besides wood and metal. They also can be made as integral pieces with hook-shaped lower ends 50. Besides, as best shown in FIG. 6, the tongs 41 and 42 can include two separate wooden arms 46 having I-hooks 61, 62 at their upper ends 43, such that, when being assembled, each tong 41, 42 would be suspended on the chain 16 by a clasp 63 protruding through both I-hooks 61, 62 and a respective link 38 of the chain 16.

Figure 6:
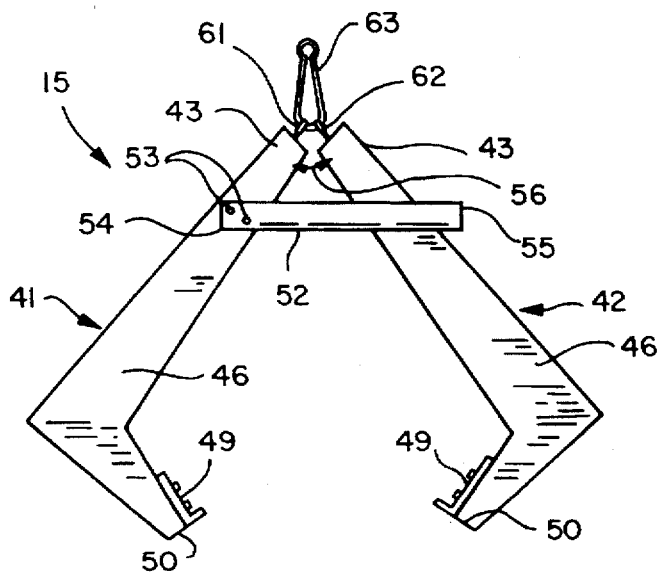
FIG. 6 shows a modification of the gripper (provided with a stabilizer bar thereon).
Figure 5A:
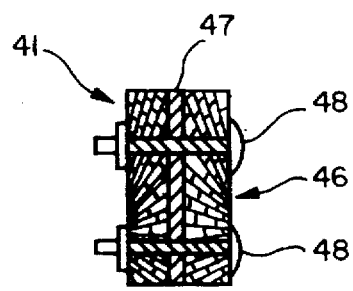
FIG. 5A is a cross-section of FIG. 5 taken along lines 5A—5A thereof.

The modified gripper 15, shown in FIG. 6, has a stabilizer strip 52 connected by fasteners 53 to one of the tongs, for example 41, at the end 54 of the strip 52. Another end 55 of the stabilizer strip 52, is free to move. The stabilizer strip 52 maintains the tongs 41, 42 in one plane. Besides, it can facilitate in manipulating the gripper 15.

In order to manipulate the gripper 15, a beekeeper (not shown) places four fingers (from index to the pinky) of his (or her) hand beneath the stabilizer strip 52, and the thumb presses the tong 41 from up-down. In the same time, the free end 55 of the stabilizer strip 52 frictionally engages another tong 42. By changing the distance between the thumb and the other four fingers of the hand, the beekeeper can change an angle 56 between the tongs 41, 42, and therefore can change a distance between the lower ends 50 of the tongs 41 and 42 when it is needed to engage or disengage the side walls 60 of the box 11.

Optionally, an extra eye-bolt 57 (best shown in FIGS. 7C–7D) is provided. The rope 17 may protrude through the eye-bolt 57, and when the eye-bolt 57 is inserted in one of the apertures 35, it provides an additional support for the rope 17 pulled out through the hole 28 of the leg 13 for the purposes of adjustment of the altitude of the suspension. When the legs 13, 14 are in their folded position, and the end 30 of the rope 17 is secured by the eye-bolt 32 to the upper one of the apertures 25, the eye-bolt 57, securing the rope 17 to the leg 13 close to the lower end 19 of the leg 13, can also serve the purpose of securing the chain 16 to the leg 13 by the hooks 36 and 37 engaging the eye-bolts 32 and 57, which are spaced from each other along the leg 13 a distance equal to the length of the chain 16.

In use, the beekeeper pulls apart the legs 13, 14 at their lower ends and adjusts the distance between them by the rope 17, (which also performs the function of preventing the legs from moving further apart). The legs 13, 14 are positioned a certain distance 58 (best shown in FIGS. 9A–9C) from the beehive 12, and the chain 16 is suspended below the suspension point 33. The length of the chain 16 is adjusted for the proper height of the gripper 15, the gripper 15 is hung onto the chain 16, and the legs are tilted towards the beehive 12 in the plane 39. The hook-shaped members 49 of the gripper 15 are disposed in the recesses 59 on the opposite side walls 60 of the box 11. After the hook-shaped members 49 engage the recesses 59 (which are standard hand recesses formed in each box), the legs 13, 14 are tilted in the opposite direction, as best shown in FIGS. 8A–8C and 9A–9C.

In this manner, the top box 11 in the beehive 12 is initially slightly lifted relative to its original position above the lower box 11' and thereafter is moved towards the desired position on the ground (or the other base) 34. After the upper box 11 is moved away from the lower box 11', the lower box 11' is easily accessed and can be inspected and serviced. To re-install the top box 11 to the place, the procedure is reversed.

After servicing the beehive boxes and putting them back in place, the gripper 15 is released, the chain 16 is removed from the legs 13, 14, and the legs 13, 14 are folded together and maintained in the folded position by the rope 17, the end 30 of which is secured by the eye-bolt 32 to the upper one of the apertures 35. Optionally, the chain 16 can be secured to the leg as discussed above. The two legs 13, 14 must be short enough that the beekeeper can easily reach the apex (suspension point 33) during operation, and long enough within that constraint to accommodate operation on as high a stack of beehive boxes as possible. Therefore, six foot legs are preferred for the purpose of the present invention.

The above-described device 10 has many advantages, and meets a number of objectives, as follows:

1. Most hobbyist beekeepers work alone; therefore the device 10 of the present invention is designed for easy operation by one person.
2. Hobbyist beekeeping is traditionally a low-cost activity. Many beekeepers would abandon their hobby if they couldn't at least about break even through sales of honey, wax, and other products of the hive. The device 10 is designed to be inexpensive and easily constructed (and reparable) with widely available off-the-shelf parts and materials.
3. The device 10 is light and portable enough, such that one person can easily carry it by hand out to a hive (or hives) along with other gear. It collapses easily for transporting and storage.
4. Since the beekeeping is performed out-of-doors, the device may suffer rough handling; and may be left out in the weather. Accordingly, the device 10 is designed to be constructed entirely of durable, weather-resistant parts and materials (pressure treated lumber and/or plywood, corrosion resistant metal, and plastics).
5. The device 10 contains significant safety features inherent in its structural geometry, as follows:
    a. The beekeeper must keep one hand on the apex whenever a load is suspended; therefore the beekeeper is unable ever to position his/her body parts other than feet beneath a suspended load.
    b. The structure virtually requires both hands to remain firmly on the device throughout its operation (one hand on the apex, the other steadying the load). So, any catastrophic failure of the device 10 would likely elicit a protective reflex response from the beekeeper.
    c. The device 10 cannot balance a suspended load by itself without the beekeeper; so the load cannot be left suspended. The load must be returned to the ground and the device 10 must be detached from the load and set aside before the beekeeper can turn his attention to anything else, such as servicing the exposed hive box. Thus, the device 10 inherently prevents dangerous conditions or catastrophic accidents.
    d. The structure of the hinged tongs prevents the device 10 from lifting more than one box at a time. This limitation improves the safety of the device 10 by limiting the amount of weight that would fall should a catastrophic failure occur. It also improves safety by preventing the beekeeper from increasing the likelihood of a catastrophic failure by attempting to lift more weight than the device 10 is designed to support.
6. The invention accomplishes two functions in a single device. It both lifts the box and moves it to a temporary location at rest beside the hive (or the same procedure in reverse).
7. Many beekeepers are elderly or infirm. In addition, dexterity may be impaired due to arthritis in the fingers, swelling of fingers due to bee stings, and/or the wearing of heavy protective gloves. So the invention is designed with large, easily manipulatable components requiring minimal dexterity and providing a maximum mechanical advantage. The tongs 41, 42 are easily attachable to the load, and to the chain, with one hand. No great dexterity is required to set up, operate, or collapse the device 10.

The device 10 directly employs basic principles of leverage to dramatically reduce the difficulty of lifting and moving beehive boxes, by reducing the force required to lift the beehive boxes (which are heavy and have a substance called "propolis" inside the hive which tends to make the stacked boxes stick together) to a fraction of the weight of the load; and the force that is required is delivered by the beekeeper from a comfortable and safe posture. The beekeeper stays farther away from the bees and disturbs them less than he or she would without the device 10.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. In combination with a beehive capable of standing on a base, the beehive comprising at least one box having opposite side walls, a device for moving said at least one box from a first position to a second position thereof, the device comprising:

a pair of legs capable of being in an expanded position and in a folded position thereof, each of said pair of legs having an upper end and a lower end;

wherein the upper ends of said legs are connected to each other, and wherein, in their expanded position, said legs are angled to each other at their upper ends in a first plane, and are capable of pivoting in a second plane, substantially perpendicular to said first plane, and relatively to said base about an axis connecting the lower ends of said legs;

a gripper comprising two tongs each tong having a first end and a second end, the tongs being affixed and angled to each other at their first ends and being shaped at their second ends to removably engage the opposite side walls of said at least one box; and a suspension means suspending the gripper to the upper ends of said pair of the legs;

wherein the lower ends of said pair of the legs, in their expanded position, can be placed on the base a certain distance from the beehive, and are tilted in said second plane towards the beehive until the second end of each tong of the gripper engages a respective one of said opposite side walls of said at least one box in the first position thereof, and wherein said pair of legs is tilted in said second plane from the beehive, thereby moving said at least one box to the second position thereof.

2. The device of claim 1, wherein said opposite side walls of said at least one box have respective recesses, and wherein the respective second ends of the tongs are provided with hook-shaped means to fit into the recesses.

3. The apparatus of claim 1, wherein each tong further includes a plate secured to the first end of the tong, the plates of the tongs being pivoted to each other by a pivot pin, and wherein a hook is secured to the pivot pin to facilitate suspension of the gripper to the suspension means.

4. The apparatus of claim 1, wherein the suspension means includes a chain with adjustable length.

5. The apparatus of claim 4, wherein the chain includes a plurality of links, and wherein the chain has a pair of hooks, each at a respective end of the chain, the chain being secured to the upper ends of the legs by means of one of said pair of hooks, and wherein the length of the chain is adjusted by means of engaging another one of said pair of hooks to a respective one of said plurality of the links.

6. The device of claim 1, wherein the legs are pivoted to each other at their upper ends, wherein a through hole is provided adjacent to the lower end of a first one of said pair of the legs, and wherein a rope is secured with one end thereof to a second one of said pair of legs, wherein another end of the rope protrudes through said through hole on said first one of said pair of legs, and wherein a distance between the lower ends of the legs is adjustable by means of said rope.

7. The device of claim 6, wherein a first eye-bolt is provided at said another end of the rope, wherein a plurality of apertures is provided along said first one of said pair of the legs, and wherein the first eye-bolt engages a respective one of said plurality of apertures corresponding to a required distance between the legs at their lower ends.

8. The device of claim 7, wherein one of said plurality of apertures is an upper aperture, wherein, in the folded position of said pair of the legs, the first eye-bolt is secured in the upper aperture, such that the rope holds the lower ends of the legs adjacent to each other.

9. The device of claim 8, wherein a second eye-bolt is secured in one of said plurality of the apertures, and wherein the chain is secured to said first one of said pair of the legs between said first and said second eye-bolts, such that each hook on the chain engages a respective one of the first and second eye-bolts.

10. In combination with a beehive capable of standing on a base, the beehive comprising an upper box and a lower box, having opposite side walls with recesses thereon, a device for moving said upper box from a first position to a second position thereof, the device comprising:

a pair of legs capable of being in an expanded position and in a folded position thereof, each of said pair of legs having an upper end and a lower end;

wherein the upper ends of said legs are hinged to each other, and wherein, in their expanded position, said legs are angled to each other at their upper ends in a first plane, and are capable of pivoting in a second plane, substantially perpendicular to said first plane, and relatively to the ground about an axis connecting the lower ends of said legs;

a gripper comprising two tongs, each tong having a first end and a second end, the tongs being pivoted to each other by a pivot pin at their first ends and having hook-shaped members at their second ends to removably engage the recesses on the opposite side walls of said upper box; and a length adjustable chain suspending the gripper to the upper ends of said pair of the legs;

wherein the lower ends of said pair of the legs, in their expanded position, can be placed on the base a certain distance from the beehive, and are tilted in said second plane towards the beehive until the hook-shaped members of each tong of the gripper engages a respective one of said opposite side walls of said upper box in the first position thereof, wherein said pair of legs is tilted in said second plane from the beehive, thereby moving said upper box to the second position thereof; and wherein a through hole is provided adjacent to the lower end of a first one of said pair of the legs, and wherein a rope is secured with one end thereof to a second one of said pair of the legs, wherein another end of the rope protrudes through said through hole on said first one of said pair of the legs, and wherein a distance between the lower ends of the legs is adjustable by means of said rope.

11. In combination with a beehive on a base having at least one box provided with opposite side walls, a method for moving said at least one box from a first position to a second position thereof, comprising the steps of:

providing a pair of legs angled to each other at their respective upper ends in a first plane, positioning said pair of legs a certain distance from the beehive with lower ends of the legs secured to the base, providing a gripper including a pair of tongs pivoted with respect to each other at their first ends and having hook-shaped second ends, providing a suspension means, suspending the gripper to the upper end of said pair of legs by means of said suspension means, tilting said pair of legs towards said at least one box in the first position thereof, simultaneously maintaining the lower ends of the legs secured to the base, engaging the opposite side walls of said at least one box by the hook-shaped second ends of the tongs of the gripper, tilting said pair of legs in the opposite direction from the beehive, thereby moving said at least one box from the first position to the second position thereof, and disengaging the gripper from said at least one box once the box has been placed to the second position thereof.

12. The method of claim 11, further comprising the step of providing a rope securing the lower ends of the legs a desired distance from each other.

13. The method of claim 12, further comprising the steps of:

disengaging the gripper from the pair of said legs, removing the suspension means, pulling one end of the rope along the respective one of the legs towards the upper end therefore, and securing said one end of the rope close to the upper end of said respective one of the legs once the lower end of the legs are attached to each other, thereby folding the legs to each other.

14. The method of claim 11, wherein the beehive includes an upper box and a lower box, further comprising the steps of:

moving the upper box from the first position on the lower box to the second position, inspecting and servicing the lower box, and moving the upper box back from the second position to the first position thereof.

* * * * *